Feb. 11, 1958   N. O. W. MULSOW   2,822,693
TEMPERATURE REGULATED VALVE CONTROL MECHANISM
Filed Feb. 18, 1954   4 Sheets-Sheet 1
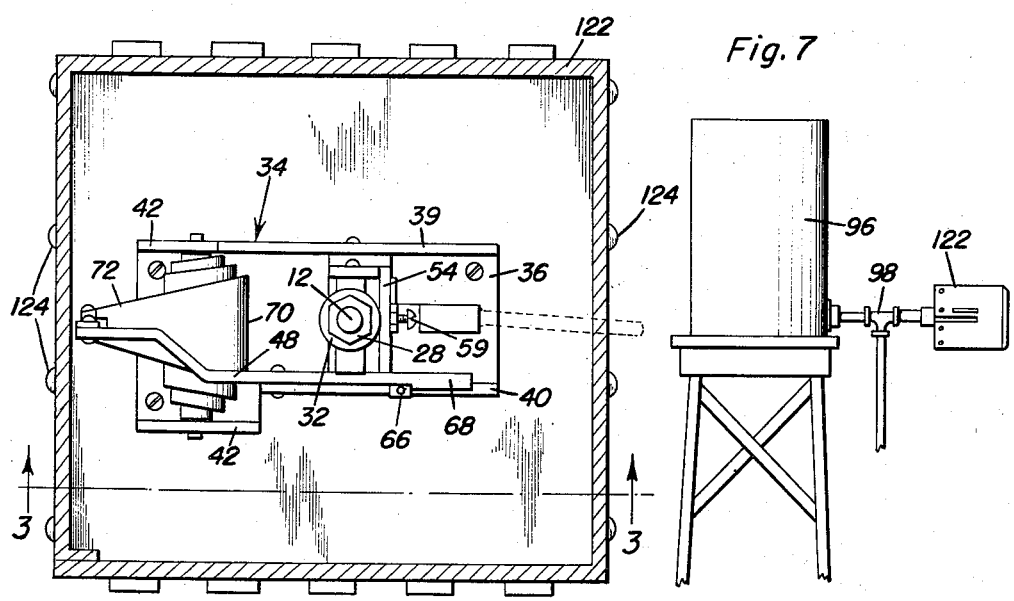
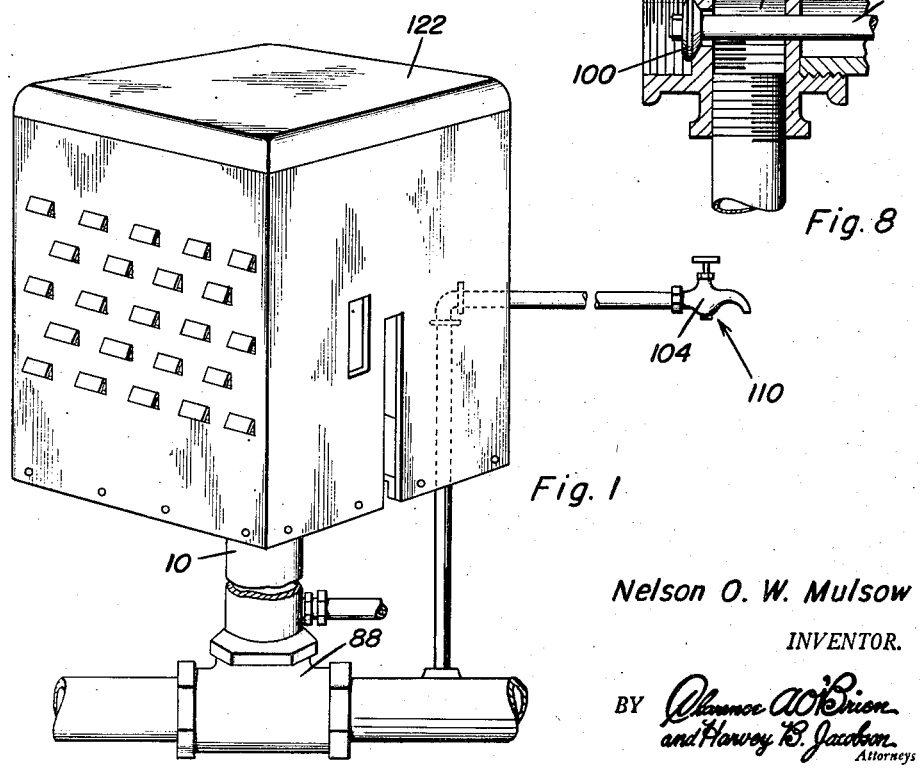
Nelson O. W. Mulsow
INVENTOR.

Feb. 11, 1958 N. O. W. MULSOW 2,822,693
TEMPERATURE REGULATED VALVE CONTROL MECHANISM
Filed Feb. 18, 1954 4 Sheets-Sheet 2
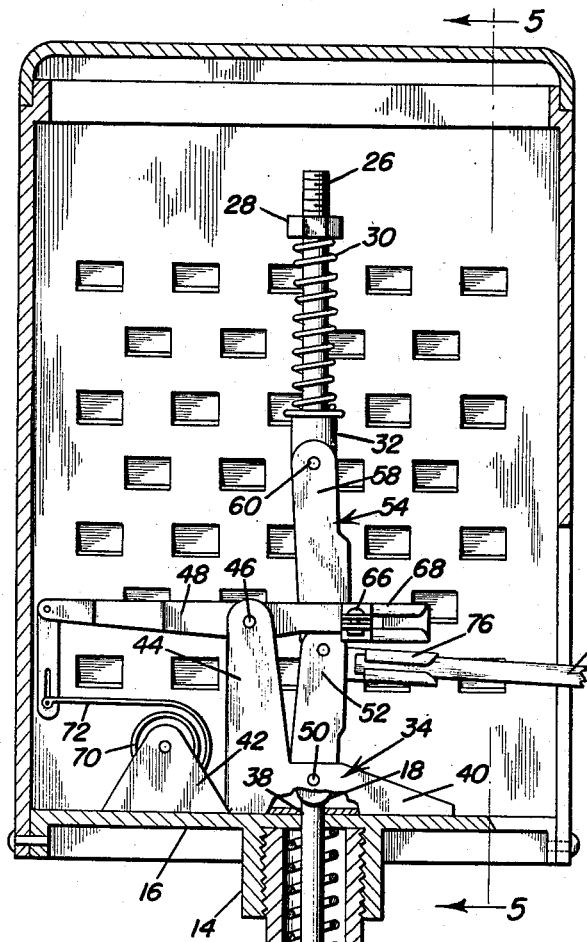
Fig. 3
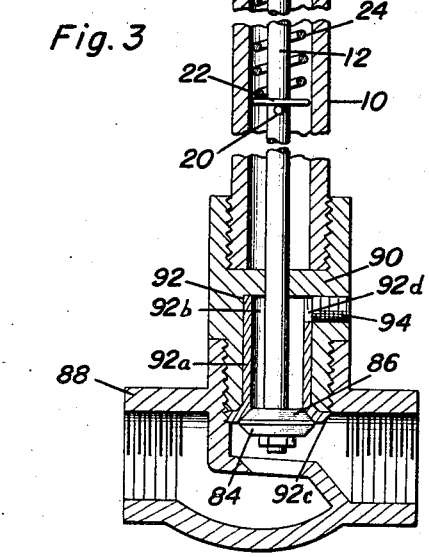
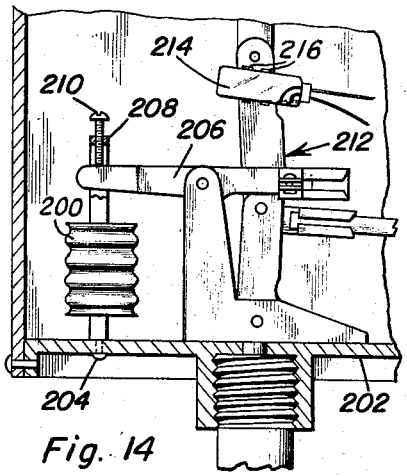
Fig. 14
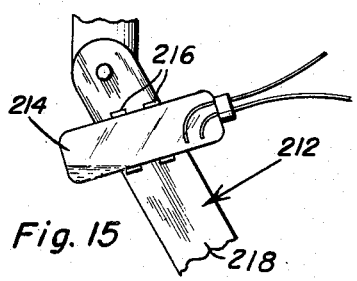
Fig. 15
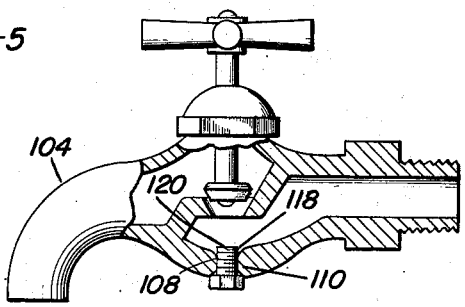
Fig. 10
Nelson O. W. Mulsow
INVENTOR.
BY Clarence A. O'Brien
and Harvey B. Jacobson
Attorneys

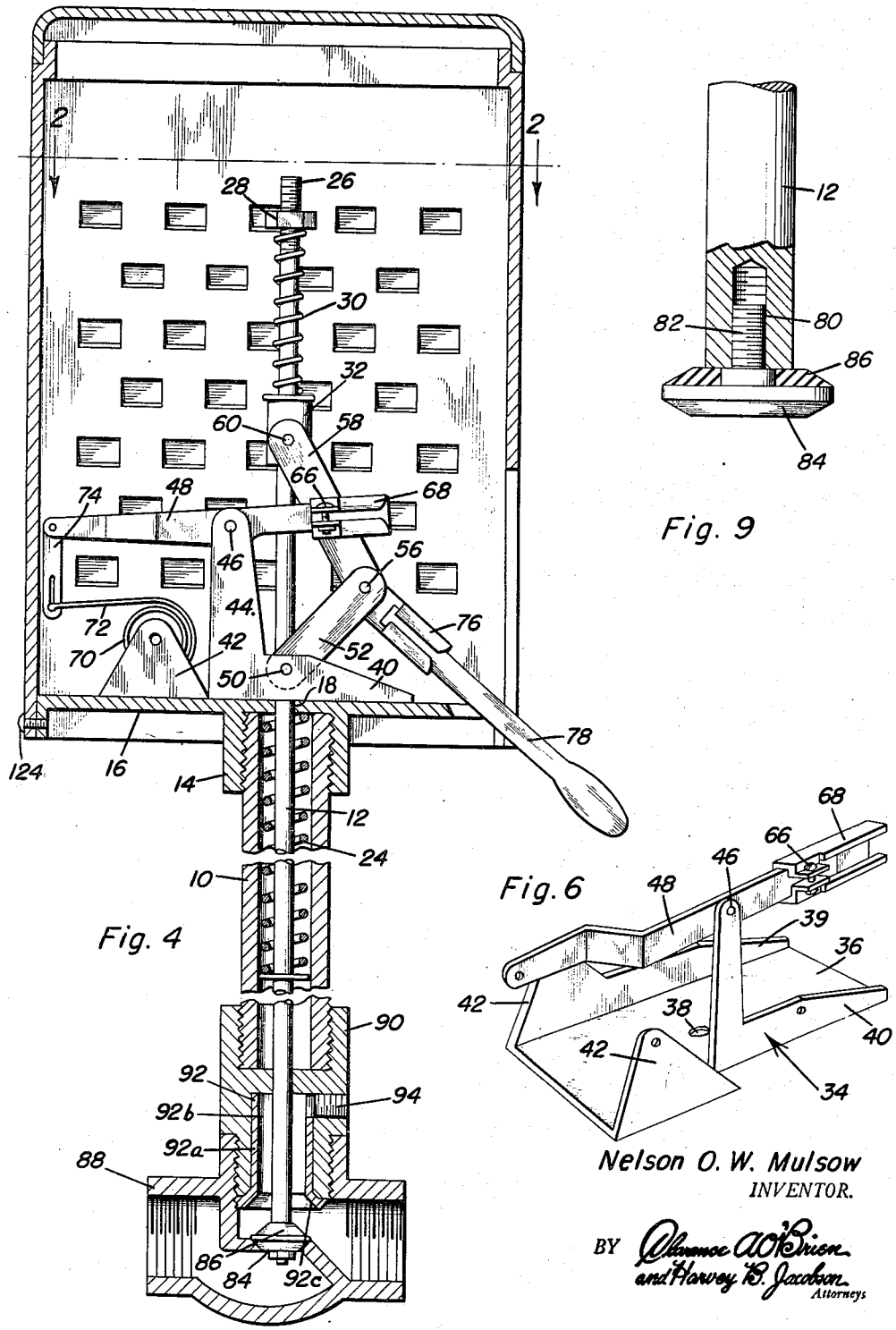

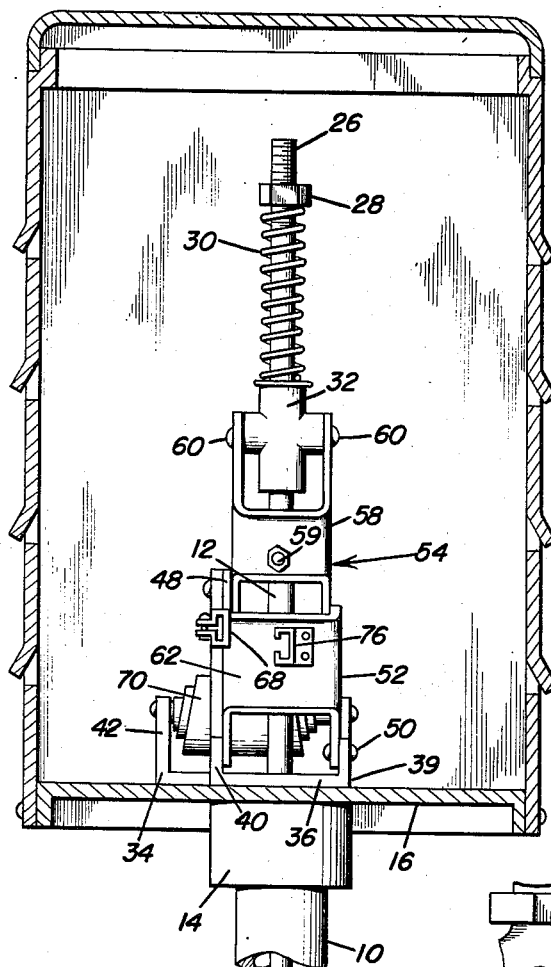
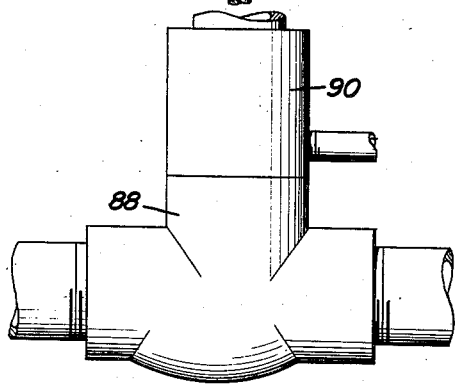
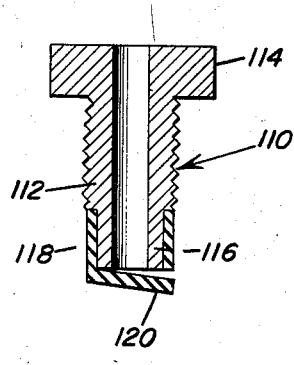
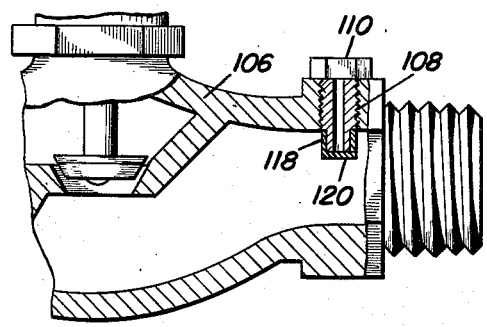
Nelson O. W. Mulsow
INVENTOR.

United States Patent Office 2,822,693
Patented Feb. 11, 1958

2,822,693

TEMPERATURE REGULATED VALVE CONTROL MECHANISM

Nelson O. W. Mulsow, Carrollton, Tex.

Application February 18, 1954, Serial No. 411,119

5 Claims. (Cl. 74—2)

This invention relates to a temperature regulated valve control mechanism and has for its primary object automatically to control the movement of a valve head in a valve body with relation to the valve seat, to establish or to cut off the flow of fluid through the flow passage of the valve body according to the purposes for which the valve is used.

Another object is to drain a tank of the contents thereof when the temperature of the surrounding atmosphere attains a predetermined value.

A still further object is automatically to interrupt the flow of water from a source of supply to the water system of a building, such as a dwelling, or the like, when the temperature falls below a predetermined value and to drain the water from the water system in the building in order to eliminate injury to the water system.

The above and other objects may be attained by employing this invention which embodies among its features an elongated stem movable along its longitudinal axis, means yieldingly to advance the stem along its axis in one direction, extensible means coupled to the stem for holding the stem retracted against the effort of the yielding means, a latch pivotally supported adjacent the stem for engaging the extensible means and holding it extended against the effort of the yielding means and thermoresponsive means coupled to the latch for moving it out of engagement with the extensible means when the temperature of the surrounding atmosphere attains a predetermined value.

Other features include a valve body supported at one end of the stem, said body having a flow passage therethrough, a valve head on the stem adapted to move in the valve body to open or close the flow passage therein and a cushion between the stem and the extensible means.

This application is an improvement on my abandoned applications, Serial No. 759,884, and Serial No. 794,731.

In the drawings forming part of this specification:

Figure 1 is a perspective view of a control device embodying the features of this invention;

Figure 2 is a horizontal sectional view through the housing of the control mechanism illustrated in Figure 1;

Figure 3 is a vertical sectional view taken substantially along the line 3—3 of Figure 2 and illustrating the control mechanism in its normal position;

Figure 4 is a view similar to Figure 3 illustrating the control mechanism tripped;

Figure 5 is a vertical sectional view taken substantially along the line 5—5 of Figure 3;

Figure 6 is a perspective view of the bed plate of the valve control mechanism, the trip arm and the latch plate;

Figure 7 is a side view of a water tank or reservoir illustrating this device in use for actuating the drain valve thereof;

Figure 8 is an enlarged sectional view through the drain valve employed in the device illustrated in Figure 7;

Figure 9 is an enlarged detail view partially in section of the valve stem and valve head;

Figure 10 is a side view partially in section of a water faucet employed in the system when the device is used for draining a water system;

Figure 11 is an enlarged fragmentary view of a modified form of water faucet;

Figure 12 is a sectional view on an enlarged scale through an automatic vacuum braking valve employed in the water faucets illustrated in Figures 10 and 12;

Figure 13 is a bottom plan view of the vacuum breaking valve illustrated in Figure 12.

Figure 14 is a fragmentary view in vertical section of another, modified form of the invention, and Figure 15 is a fragmentary view in side elevation illustrating the closing position of a switch embodied in the modified form illustrated in Figure 14.

Referring to the drawings in detail this improved valve control mechanism comprises a tubular support 10 through which a stem 12 is mounted to slide longitudinally. Opposite ends of the support 10 are externally screw-threaded, and threaded on one end of the support is a socket 14 carrying at one end a base plate 16 which is provided with an axial opening 18 which aligns with the opening in the tubular body 10 and through which extends the stem 12. Formed in the stem 12 within the tubular support 10 is a transversely extending opening for the reception of a pin 20 which forms a stop for a suitable washer 22 against which abuts one end of a compression coil spring 24, the opposite end of which bears against the underside of the base 16 in order to yieldingly urge the stem 12 to move longitudinally in one direction through the tubular support 10. The end of the stem 12 remote from that which projects through the tubular support 10 is externally screw-threaded as at 26, and carries a nut 28 which forms an abutment for one end of a compression coil spring 30, the purpose of which will be more fully hereinafter explained.

Mounted for longitudinal sliding movement on the stem 12 between its threaded end 26 and the base 16 is a collar 32 against which the lower end of the spring 30 bears.

Fixed to the base plate 16 is a bed designated generally 34 comprising a base 36 formed intermediate its ends with an opening 38 which aligns with the opening 18 in the base 16 to accommodate the stem 12 as will be readily understood upon reference to Figure 3. The base 36 is provided along opposite longitudinal side edges with upstanding flanges 39 and 40 adjacent one end of each of which is an upwardly extending bracket 42 the purpose of which will be more fully hereinafter explained. Extending upwardly from the flange 40 adjacent its flange 42 is an arm or pedestal 44 adjacent the upper end of which is pivotally supported at 46 a trip arm 48. The flanges 38 and 40 are pierced to receive a pivot pin 50 upon which is pivotally supported the lower link 52 of a toggle joint designated generally 54. The end of the link 52 of the toggle joint 54 remote from that which is pivoted at 50 has pivotally coupled thereto as at 56 the other link 58 of the toggle joint, and the end of this other link is pivotally connected as at 60 to the collar 32 previously mentioned. It will thus be seen that when the toggle joint is in the position illustrated in Figures 3 and 5, that is extended, the stem 12 will be held against movement under the influence of the spring 24. In order to regulate the position of the toggle joint 54 and prevent it from folding inwardly against the stem 12 I enter through a threaded opening in the web of the upper link 58 a screw 59, the end of which impinges on the stem 12 when the joint is extended. The link 52 of the toggle joint 54 comprises a transversely U-shaped body having a web 62 and mounted on the trip arm 48 for adjustment longitudinally thereof by means of a clamp screw 66 is a sleeve and socket member 68, the lower edge of which is adapted to engage behind the web 62 as illustrated in Figure 5 to hold the toggle joint 54 extended against the effort of the spring 24. Mounted between the bracket arms 42 of the bed 34 is a thermally-responsive unit 70 from which projects an arm 72, the free end of which is coupled by means of a link 74 with the end of the trip arm 48 remote from the socket member 68. It will thus be seen that as the thermally-responsive unit 70 expands or contracts, the arm 72 will move the link 74, thereby to rock the trip arm 48 about its pivot 46. A suitable handle receiving socket 76 is carried by the link 52 for the reception of one end of a handle 78 by means of which the parts may be restored to their original positions after the trip arm 48 has been moved to move the sleeve 68 out of engagement with the web 62. It will thus be seen that upon contraction of the thermally responsive unit 70, the socket member 68 will be moved out of engagement with the web 62 to permit the extensible member, represented by the toggle joint 54 to collapse.

In the form of the invention illustrated in Figures 1 through 5 inclusive the stem 12 is provided at the end remote from the threaded end 26 with an internally screw-threaded socket 80 for the reception of the threaded stem 82 of a valve head 84. Interposed between the head 84 and the end of the stem 12 is a gasket 86. This valve head 84 is mounted to reciprocate in a valve body 88 having a flow passage therethrough which is adapted to be closed by the valve head 84 when it is moved under the influence of the spring 24. The valve body 88 is also provided with a radial extension carrying a suitable adapter 90 having an axial passage 92 with which communicates a radially disposed internally screw-threaded discharge opening 94. A bushing 92a in the passage 92 has an axial bore forming a drain passage 92b in the adapter 90 which opens into the flow passage in valve body 88. The bushing 92a is formed at one end of the adapter 90 in the flow passage with a valve seat 92c for the gasket 86 and at its opposite end with a lateral passage 92d aligned with the opening 94.

As illustrated the valve stem 12 operates axially through the bushing 92a and adapter 90, and when the valve is in flow passage opening position as illustrated in Figures 3 and 5, the gasket 86 bears against the valve seat 92c at one end of the adapter 90 and closes the passage 92b therethrough. It will thus be seen that the gasket 86 is yieldingly held in discharge passage closing position under the influence of the cushioning spring 30 so long as the extensible member or toggle joint 54 is held extended through the engagement of the web 62 thereof with the sleeve 68 of the trip arm 48. When, however, the trip arm is moved under the influence of the contraction of the thermally responsive element 70, the extensible member or toggle joint 54 will be released so as to collapse under the influence of the spring 24 as illustrated in Figure 4 and move the valve head 84 into flow passage closing position in the valve body 88.

When the device is to be used for draining an elevated tank such as is illustrated at 96 in Figure 7, a valve body 98 is coupled to the tank, and the valve stem 12 is equipped with a valve head 100 which is adapted to close the flow passage 102 through the valve body 98 when the extensible member or toggle joint 54 is in extended position. It will thus be seen that so long as the toggle joint or extensible member 54 remains extended, the discharge of the contents of the tank 96 will be prevented, but that when the temperature of the surrounding atmosphere attains a predetermined value, the thermally-responsive element 70 will move the lever 48 to disengage the sleeve 68 from the web 62, thus permitting the valve head 100 to move under the influence of the spring 24 and open the drain passage.

When the valve is used for draining the water system of a building or the like which is equipped with faucets 104 or 106, I find it advantageous to drill and tap the faucets as at 108 and introduce into each faucet so drilled a vacuum breaking valve designated generally 100. Each such valve comprises a tubular body 112 which is externally screw-threaded to match the threads of the openings 108, and carries at one end a flange 114, while the opposite end of the threaded body 112 carries a reduced extension 116 upon which a cap 118 of flexible material such as rubber or synthetic resin is adapted to be fitted. This cap is of slightly less diameter than the body 112 so as to be readily entered into its respective opening 108, and formed at the junction of the head of the cap and the side wall thereof is a transversely extending slit which forms a loose flap 120 which when pressure is exerted on the interior of the faucet closes the passage through the tubular body 112, but when a reverse flow is established through the system, this flap 120 moves to open position as illustrated in Figure 12 in order to admit air into the system to facilitate the complete drainage thereof.

In use the tubular support 10 is coupled to either the valve body 88 or 98 as the case may be and the base 16 coupled by the socket 14 to the opposite end of the tubular support. With the parts thus assembled, a suitable hood 122 is attached to the base 16 as by screws 124 and the handle 78 is inserted in the socket 76 so that the extensible member or toggle joint 54 may be moved to extended position in order to close the drain passage in the respective valve body. As the extensible member or toggle joint 54 is moved to its fully extended position, the web 62 will be engaged by the socket member 68 on the trip lever 48, thus latching the toggle joint in extended position. The valve head on the stem 12 remote from the threaded end 26 of the stem will be yieldingly held against its respective valve seat by means of the spring 30, thereby avoiding any critical adjustment between the end of the toggle joint and the valve stem. As the temperature of the surrounding atmosphere attains a predetermined value, the thermo-responsive element 70 will exert pull on the link 74, thus moving the trip arm 48 about its pivot 46 so as to disengage the socket member 68 from the web 62 and permit the valve stem 12 to move under the influence of the spring 24, thereby to open the drain valve. While the device has been disclosed as being operable upon the contraction of the thermo-responsive element 70, it will be understood that by employing a thermo-responsive element of a different character the device may be made to function not only when the temperature falls, but also when the temperature rises to a predetermined value.

In the modified form of the invention shown in Figures 14 and 15 a thermostat 200 of the bellows type is suitably fixed at one end to the base plate 202, as at 204, for contraction to operate the trip arm 206 and is operatively connected to said arm 206 by a U-shaped yoke 208 fixed to its other end in straddling relation to said arm and provided with a set screw 210 adapted to engage and operate said trip arm 206 when said thermostat 200 contracts, said arm 206 being operated so as to permit the toggle joint 212 to collapse. A mercury switch 214 is suitably fixed as at 216, on the link 218 of the toggle joint 212, corresponding to the link 58, so as to be closed when the toggle joint 212 is extended as shown in Figure 14, and to be tilted by said link into switch opening position when the toggle joint 212 folds or collapses as shown in Figure 15.

The mercury switch 214 is provided for controlling an electric circuit for operating a motor driven pump for pumping water from a source of supply to, for instance, the tank 96, or to the water system of a building, and to cut out the pump when the valve head 84 is moved into flow passage closing position in the valve body 88.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is as follows:

1. A temperature controlled valve actuating device comprising a support member having an opening extending therethrough, a stem reciprocably received in said opening, first and second compressor spring members each disposed about said stem on opposite sides of said support member, means non-slidably attaching the ends of each of said spring members remote from each other to said stem, the other end of said first spring member engaging said support, longitudinally extensible means engaging said support and the end of said second spring member adjacent said support, an arm pivoted to said support adjacent said extensible means, a latch member on said arm for engaging said extensible means and retaining it in its extended position against the action of said spring members and thermo-responsive means coupled to said arm for moving the latch member out of engagement with said extensible means when the temperature in the surrounding atmosphere attains a predetermined value.

2. A temperature controlled valve actuating device comprising a support member having an opening extending therethrough, a tubular member extending from one side of said support member in alignment with said opening, a stem reciprocably received in said opening and extending into said tubular member, a first compression spring member disposed about said stem and within said tubular member to be guided by the latter, a stop on said stem engaging the end of said first spring member remote from said support member to retain said spring member in engagement with the latter, a second spring member disposed about said stem on the side of said support remote from said tubular member, stop means carried by said stem and engaging the end of said second spring member remote from said support, extensible means engaging said support and the end of said second spring member adjacent said support, a latch arm pivotally attached to said support and engageable with said extensible means to retain said extensible means in its extended position against the action of said spring members, and thermo-responsive means coupled to said arm and said support for moving said latch member out of engagement with said extensible means when the temperature in the surrounding atmosphere attains a predetermined value.

3. A temperature controlled valve actuating device comprising a support member having an opening extending therethrough, a stem reciprocably received in said opening, first and second compressor spring members each disposed about said stem on opposite sides of said support member, means non-slidably attaching the ends of each of said spring members remote from each other to said stem, the other end of said first spring member engaging said support, a collar slidably carried by said stem and engaging the end of said second spring member adjacent to said support, a first link pivoted at one end thereof to said collar, a second link pivoted to said support adjacent said stem, means pivotally connecting the other ends of said links to each other, a latch arm pivotally attached to said support and engageable with one of said links to retain said links in their extended position against the action of said spring members, and thermo-responsive means coupled to said latch arm for moving said arm out of its link engaging position.

4. A temperature controlled valve actuating device comprising a support having an opening therein, a stem movable through said opening, means yieldingly urging said stem in one direction, a first link means slidable along said stem and having the first link pivotally connected thereto for movement about an axis transverse to said stem, a second link pivotally attached to said support for movement about an axis parallel to the axis of pivotal movement of said first link, means pivotally connecting the free ends of said links to each other, a latch arm pivotally attached to said support for movement about an axis parallel to the axis of pivotal movement of said links, a latch member on said arm and disposed in the path of movement of one of said links to retain said links in an extended position against the action of said yielding means, thermo-responsive means, means operatively connecting said thermo-responsive means to the end of said arm remote from said latch member whereby said arm is actuatable in one direction by said thermo-responsive means to disengage said link, and means on one of said links for engaging said arm to permit the latter to move into latching position when said links are moved into their extended position.

5. A temperature controlled valve actuating device comprising a support having an opening therein, a stem movable through said opening, means yieldingly urging said stem in one direction, a first link means slidable along said stem and having the first link pivotally connected thereto for movement about an axis transverse to said stem, a second link pivotally attached to said support for movement about an axis parallel to the axis of pivotal movement of said first link, means pivotally connecting the free ends of said links to each other, a latch arm pivotally attached to said support for movement about an axis parallel to the axis of pivotal movement of said links, a latch member on said arm and disposed in the path of movement of one of said links to retain said links in an extended position against the action of said yielding means, thermo-responsive means, means operatively connecting said thermo-responsive means to the end of said arm remote from said latch member whereby said arm is actuatable in one direction by said thermo-responsive means to disengage said link, means on one of said links for engaging said arm to permit the latter to move into latching position when said links are moved into their extended position, a housing secured to said support and enclosing said valve actuating device, and a combined handle and indicator member attached to one of said links and extending outwardly of said housing.

References Cited in the file of this patent

UNITED STATES PATENTS

| | | |
|---|---|---|
| 1,445,036 | Pocock | Feb. 13, 1923 |
| 1,526,718 | Opp | Feb. 17, 1925 |
| 2,134,257 | Leutwiler | Oct. 25, 1938 |
| 2,144,399 | Betz | Jan. 17, 1939 |
| 2,240,763 | Dillman | May 6, 1941 |
| 2,540,941 | Graham | Feb. 6, 1951 |